(12) United States Patent
Yasui

(10) Patent No.: US 7,470,937 B2
(45) Date of Patent: Dec. 30, 2008

(54) OPTICAL MODULE

(75) Inventor: Nobuyuki Yasui, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 149 days.

(21) Appl. No.: 11/673,617

(22) Filed: Feb. 12, 2007

(65) Prior Publication Data

US 2008/0118250 A1  May 22, 2008

(30) Foreign Application Priority Data

Nov. 16, 2006  (JP)  ............... 2006-310708

(51) Int. Cl.
*H01L 33/00* (2006.01)
(52) U.S. Cl. ........................... 257/99; 257/664
(58) Field of Classification Search .............. 257/99, 257/664

See application file for complete search history.

(56) References Cited

U.S. PATENT DOCUMENTS

| 6,778,567 | B2 | 8/2004 | Sunaga |
| 7,196,389 | B2 * | 3/2007 | Yasui .................... 257/433 |

FOREIGN PATENT DOCUMENTS

| EP | 1655630 | 10/2006 |
| JP | 2003-037329 | 2/2003 |
| JP | 2003-332667 | 11/2003 |
| JP | 2006-128545 | 11/2004 |
| JP | 2005-259762 | 9/2005 |

* cited by examiner

*Primary Examiner*—Mark Prenty
(74) *Attorney, Agent, or Firm*—Leydig, Voit & Mayer, Ltd.

(57) ABSTRACT

An optical module comprises: a stem; a protruding portion on a surface of the stem; an optical semiconductor device mounted on the protruding portion; a power supply terminal penetrating through the stem, the power supply terminal being insulated from the stem; a first dielectric substrate mounted on the protruding portion; a first signal line on the first dielectric substrate and connected to a first end of the power supply terminal; a second dielectric substrate on a rear surface of the stem; and a second signal line on the second dielectric substrate and connected to a second end of the power supply terminal. The second signal line has an electrical length of 23.0-36.2 mm and an impedance of 21.5-24.5Ω.

2 Claims, 10 Drawing Sheets

OPTICAL MODULE

FIELD OF THE INVENTION

The present invention relates to an optical module containing an optical semiconductor device for optical communications, and more particularly to an optical module capable of operating at high temperature with low power consumption while providing a modulated optical waveform of good quality.

BACKGROUND ART

Optical modules containing an optical semiconductor device have been used for optical communications. If a high frequency signal having a transmission rate of 10 Gbps or higher is applied to these optical modules, reflections will occur due to an impedance mismatch between the stem and the optical semiconductor device, resulting in degraded transmission characteristics. To solve this problem and thereby improve the transmission characteristics, conventional optical modules additionally include a resistive element for impedance matching which is disposed near the optical semiconductor device (see, e.g., Japanese Laid-Open Patent Publication Nos. 2006-128545, 2003-37329, and 2003-332667).

However, such a conventional optical module configuration is disadvantageous in that the added resistive element prevents the optical module from operating at increased temperature and with reduced power consumption.

SUMMARY OF THE INVENTION

The present invention has been devised to solve the above problems. It is, therefore, an object of the present invention to provide an optical module capable of operating at high temperature with low power consumption while providing a modulated optical waveform of good quality.

According to one aspect of the present invention, an optical module of the present invention comprises: a stem; a protruding portion formed on a surface of the stem; an optical semiconductor device mounted on the protruding portion; a power supply terminal provided so as to penetrate through the stem, the power supply terminal being insulated from the stem; a first dielectric substrate mounted on the protruding portion; a first signal line formed on the first dielectric substrate such that the first signal line is connected to one end of the power supply terminal; a second dielectric substrate formed on a rear surface of the stem; and a second signal line formed on the second dielectric substrate such that the second signal line is connected to the other end of the power supply terminal; wherein the second signal line has an electrical length of 23.0-36.2 mm and an impedance of 21.5-24.5Ω.

The present invention allows for an improvement in the transmission characteristics of an optical module without adding a resistive element for impedance matching. Therefore, the present invention can provide an optical module capable of operating at high temperature with low power consumption while providing a modulated optical waveform of good quality.

DETAILED DESCRIPTION OF THE PREFERRED EMBODIMENTS

Figure 1:
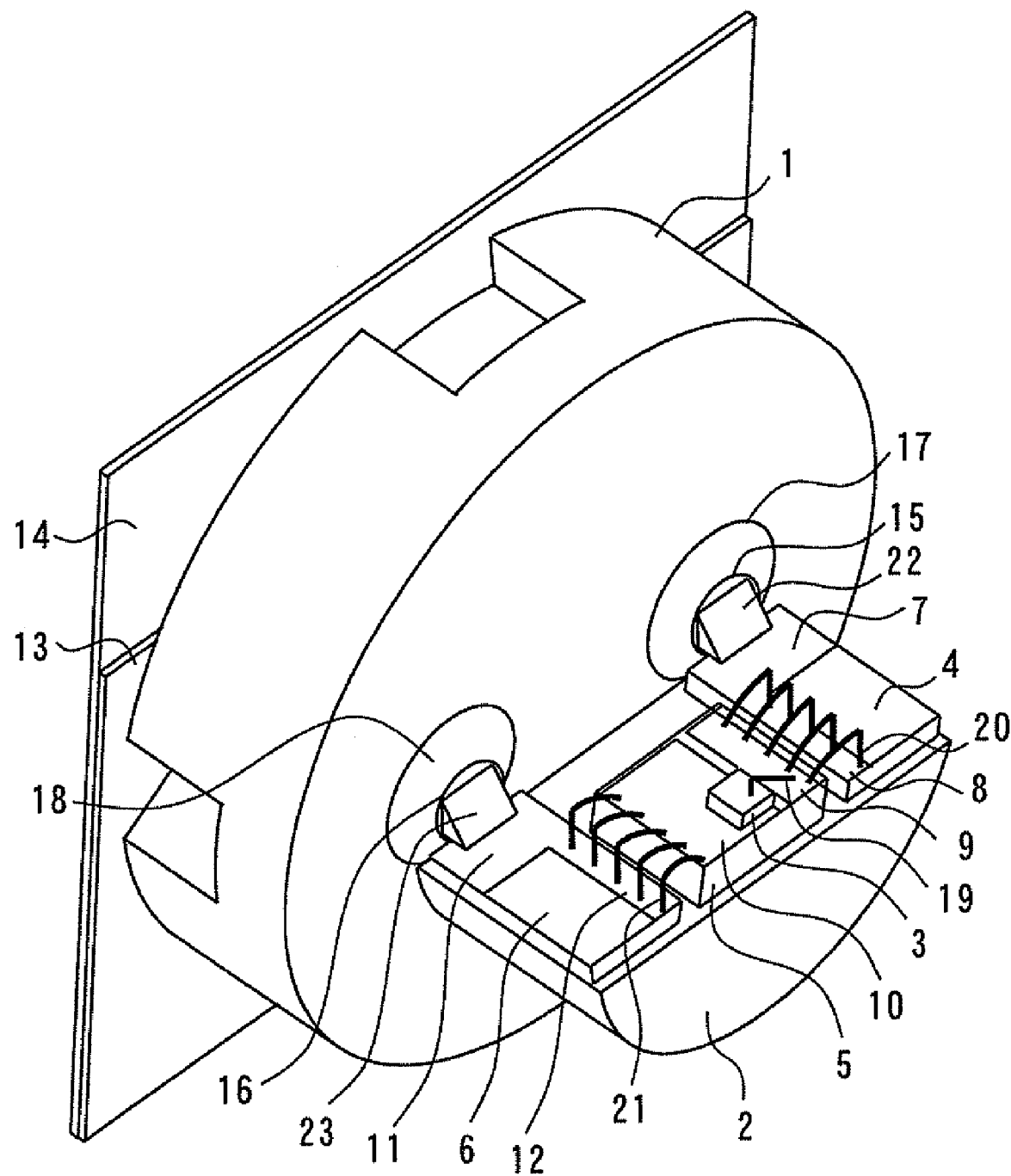
FIG. 1 is a perspective view of an optical module according to an embodiment of the present invention as viewed from the front.
Figure 2:
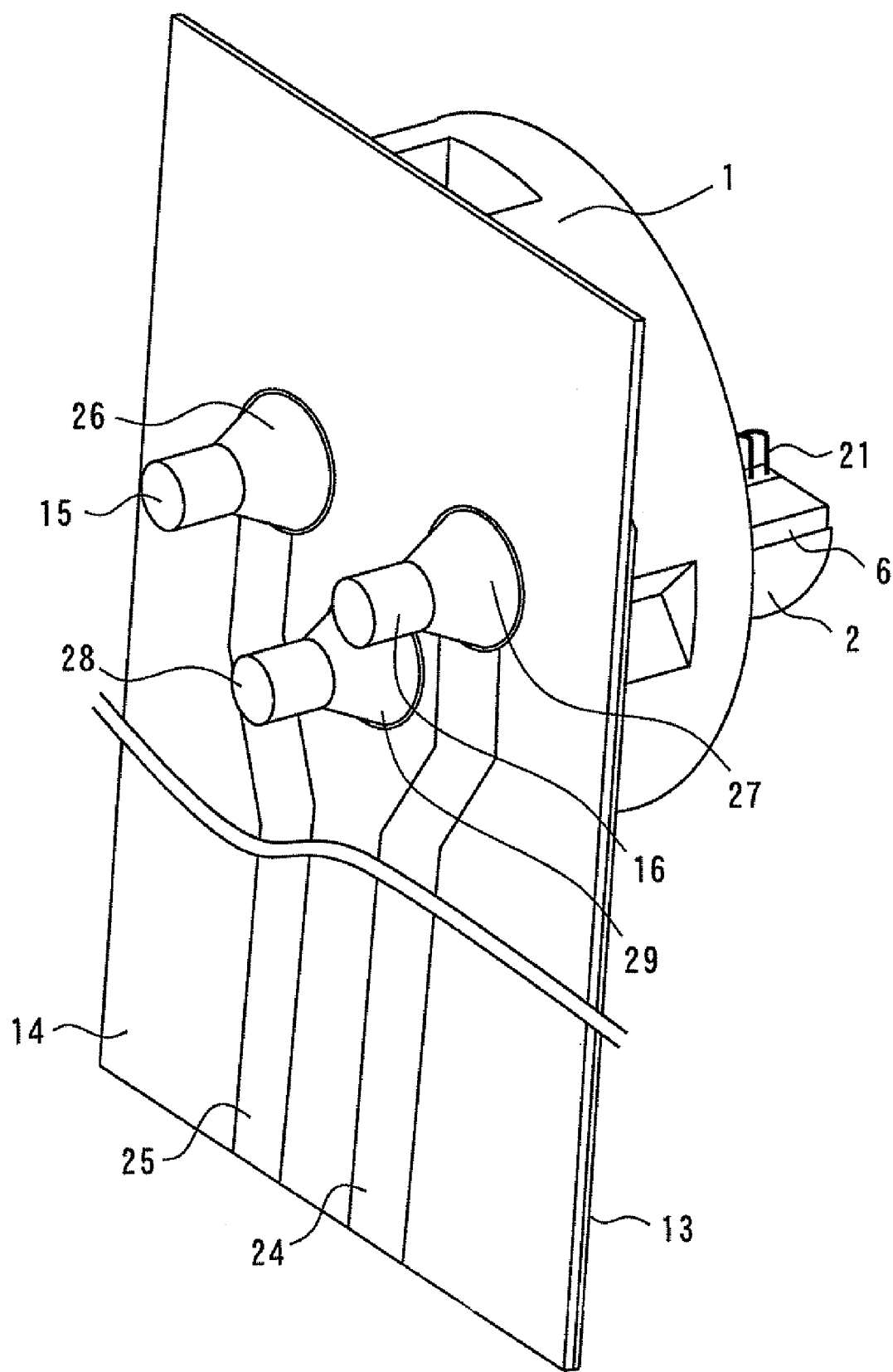
FIG. 2 is a perspective view of the optical module according to an embodiment of the present invention as viewed from the rear.

FIG. 1 is a perspective view of an optical module according to an embodiment of the present invention as viewed from the front, and FIG. 2 is a perspective view of the optical module as viewed from the rear.

Referring to these figures, a protruding portion (or mount block) 2 having a semicylindrical shape is formed on the front surface of a stem 1. An optical semiconductor device 3 and dielectric substrates (or first dielectric substrates) 4, 5, and 6 are mounted on the protruding portion 2. Signal lines (or first signal lines) 7 and 8 are formed on the dielectric substrate 4 and connected to each other. Signal lines 9 and 10 are formed on the dielectric substrate 5 such that they are spaced apart from each other. Signal lines (or first signal lines) 11 and 12 are formed on the dielectric substrate 6 and connected to each other.

A conductor layer 13, which is connected to ground GND, is connected to the rear surface of the stem 1, and a dielectric substrate (or second dielectric substrate) 14 is formed on the rear surface of the conductor layer 13. Lead pins (or power supply terminals) 15 and 16 are provided so as to penetrate through the stem 1 and the conductor layer 13. It should be noted that the lead pins 15 and 16 are insulated from the stem 1 by dielectrics 17 and 18, respectively, formed between the stem 1 and these lead pins.

One end of the optical semiconductor device 3 is connected to the signal line 10, and the other end is connected to the signal line 9 by a wire 19. The signal line 8 is connected to the signal line 9 by wires 20, and the signal line 10 is connected to the signal line 12 by wires 21. One end of the lead pin 15 is connected to the signal line 7 by solder 22, and one end of the lead pin 16 is connected to the signal line 11 by solder 23. That is, the signal line 8 is connected between the one end of the lead pin 15 and the optical semiconductor device 3, and the signal line 12 is connected between the one end of the lead pin 16 and the optical semiconductor device 3.

Signal lines 24 and 25 are formed on the dielectric substrate 14. The other end of the lead pin 15 is connected to the signal line 25 by solder 26, the other of the lead pin 16 is connected to the signal line 24 by solder 27, and a lead pin 28 is connected to the stem 1 by solder 29.

The dielectrics 17 and 18 are made of glass; the lead pins 15 and 16 are made of a metal such as copper; the dielectric substrates 4, 5, and 6 are made of alumina; and the dielectric substrate 14 is made of polyimide. Signal lines 7, 9, 10, 11, 24, 25; 8, and 12 are metal films, for example, copper films (or foils), having a thickness of 0.001 mm. The signal lines 7 and 11 have a length of 0.2 mm and a width of 0.7 mm. The signal line 9 has a length of 0.3 mm and an impedance of 25Ω. The signal line 10 has a length of 0.7 mm and an impedance of 25Ω. The signal lines 8 and 12 have a length of 1.0 mm and an impedance of 42Ω. The impedance of the portion of the lead pin 16 covered with the dielectric 18 is 25Ω.

The high frequency signal applied to the signal line 24 is transmitted to the signal line 25 through the lead pin 16, the signal lines 11 and 12, the optical semiconductor device 3, the signal lines 7 and 8, and the lead pin 15 in that order. It should be noted that the inductive components of the wires 21 and the resistance of the optical semiconductor device 3 are approximately 5Ω to 10Ω whereas the impedances of the signal line 24, the lead pin 16, and the signal lines 10, 11, and 12 are approximately 25Ω. Therefore, an impedance mismatch occurs between the optical semiconductor device 3 and the end of the signal line 24 or the signal line 25. This means that if a high frequency signal having a transmission rate of 10 Gbps or higher is applied to this optical module, the modulated optical waveform produced by the module has distortion.

To overcome this problem, the signal lines 24 and 25 of the present embodiment have an impedance of 21.5-24.5Ω and an electrical length of 23.0-36.2 mm. This improves the transmission characteristics of the optical module without adding a resistive element for impedance matching, thereby allowing the module to provide a modulated optical waveform of good quality, as described in detail below.

Figure 3:
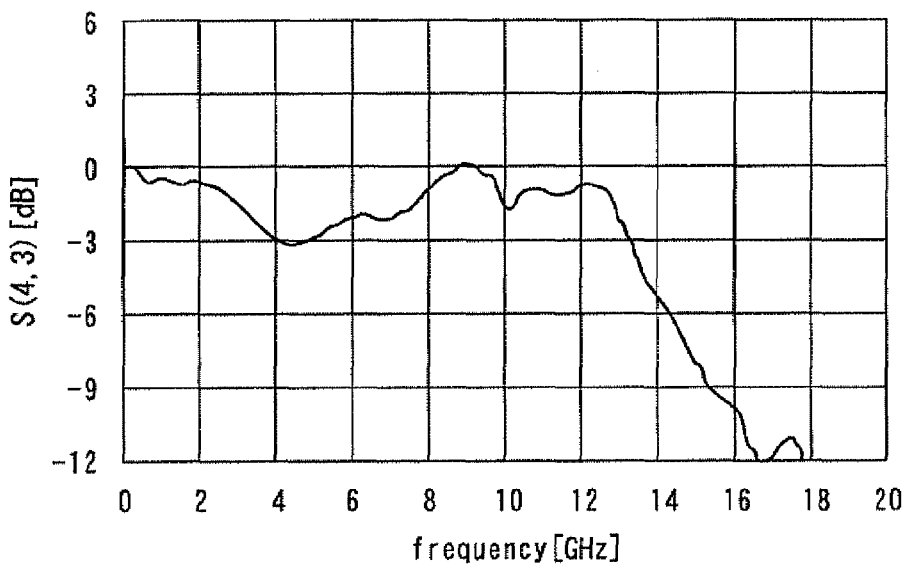
FIG. 3 shows the transmission characteristics of the optical module when the impedances of second signal lines were set to 20Ω.
Figure 4:
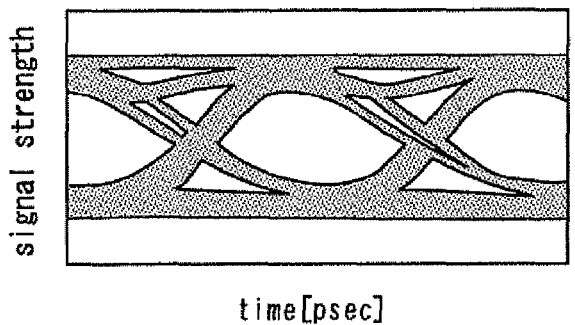
FIG. 4 shows the modulated optical waveform of the optical module when the impedances of second signal lines were set to 20Ω.
Figure 5:
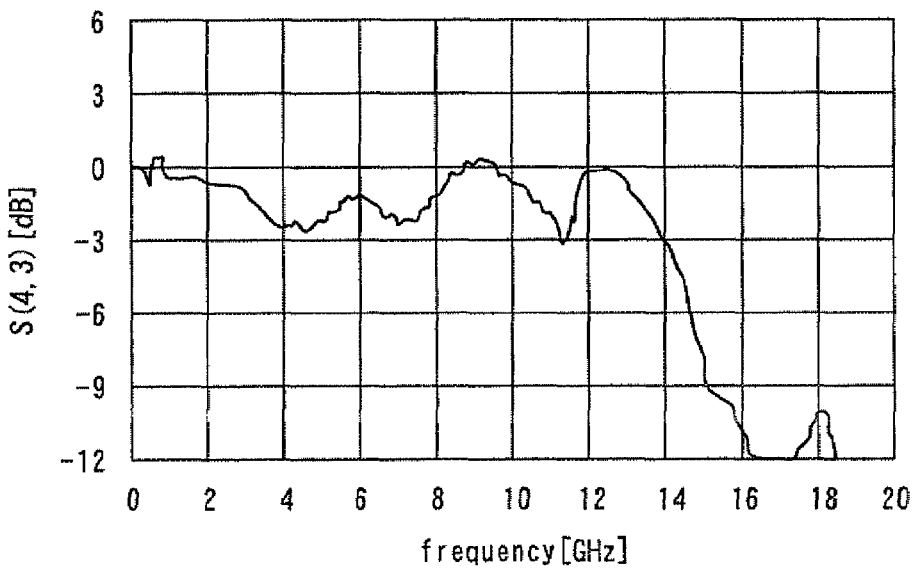
FIG. 5 shows the transmission characteristics of the optical module when the impedances of second signal lines were set to 21.5Ω.
Figure 6:
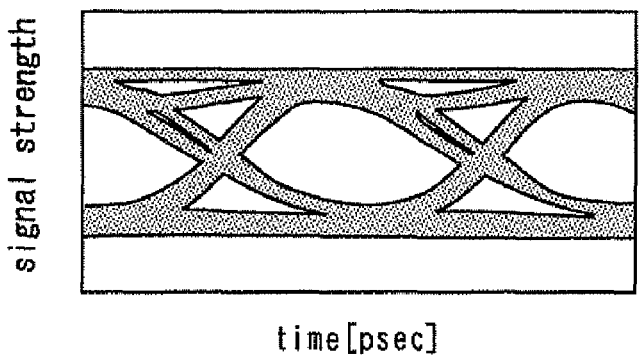
FIG. 6 shows the modulated optical waveform of the optical module when the impedances of second signal lines were set to 21.5Ω.
Figure 7:
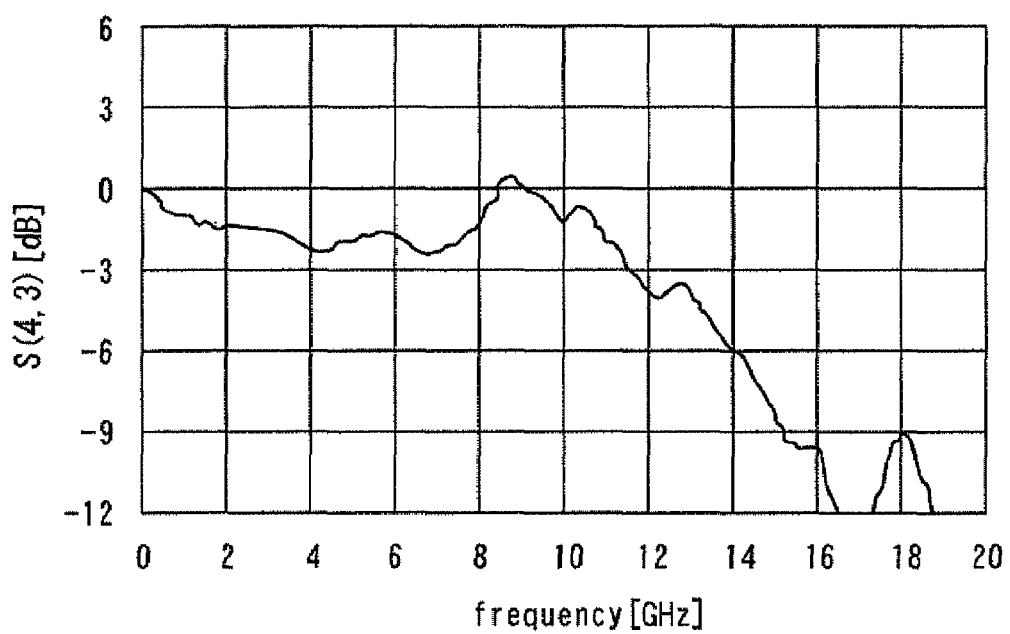
FIG. 7 shows the transmission characteristics of the optical module when the impedances of second signal lines were set to 24.5Ω.
Figure 8:
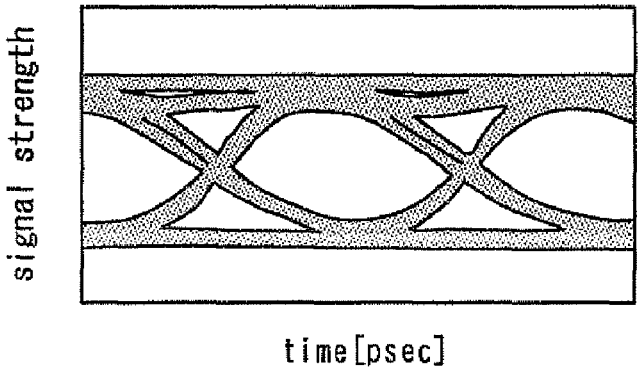
FIG. 8 shows the modulated optical waveform of the optical module when the impedances of second signal lines were set to 24.5Ω.
Figure 9:
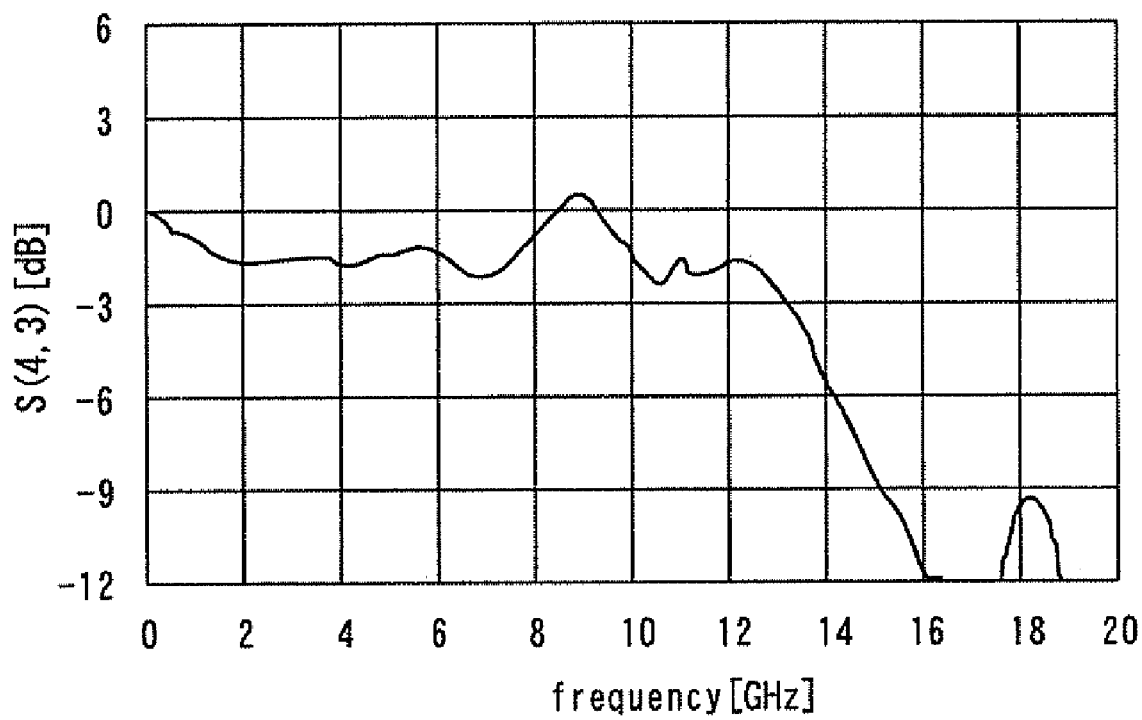
FIG. 9 shows the transmission characteristics of the optical module when the impedances of second signal lines were set to 26Ω.
Figure 10:
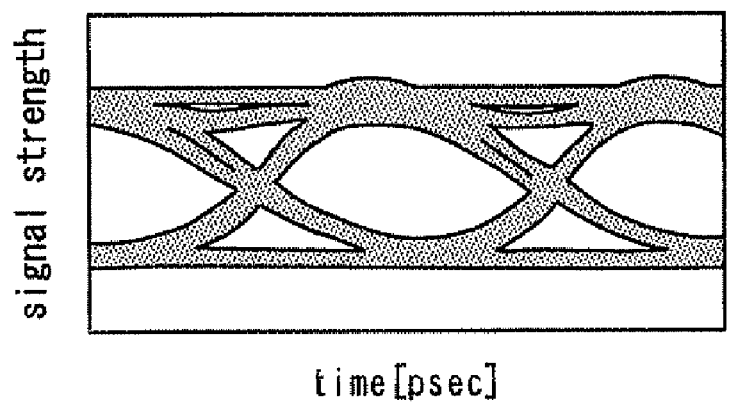
FIG. 10 shows the modulated optical waveform of the optical module when the impedances of second signal lines were set to 26Ω.

First, experiments were conducted to determine how the transmission characteristics of the optical module vary with changes in the impedances of the second signal lines 24 and 25 when the impedances of the signal lines 8 and 12 are set to 42Ω and the electrical lengths of the signal lines 24 and 25 are set to 13.4 mm. Specifically, FIGS. 3 and 4 show the transmission characteristics and the modulated optical waveform, respectively, of the optical module when the impedances of the signal lines 24 and 25 were set to 20Ω. FIGS. 5 and 6 show the transmission characteristics and the modulated optical waveform, respectively, of the optical module when the impedances of the signal lines 24 and 25 were set to 21.5Ω. FIGS. 7 and 8 show the transmission characteristics and the modulated optical waveform, respectively, of the module when the impedances of the signal lines 24 and 25 were set to 24.5Ω. Further, FIGS. 9 and 10 show the transmission characteristics and the modulated optical waveform, respectively, of the module when the impedances of the signal lines 24 and 25 were set to 26Ω. As can be seen from these figures, the optical module exhibited transmission curves having enhanced flatness when the impedances of the signal lines 24 and 25 were set to 21.5-24.5Ω, indicating improved transmission characteristics. At the same time, it also exhibited improved eye patterns, which leads to a modulated optical waveform of good quality.

Figure 11:
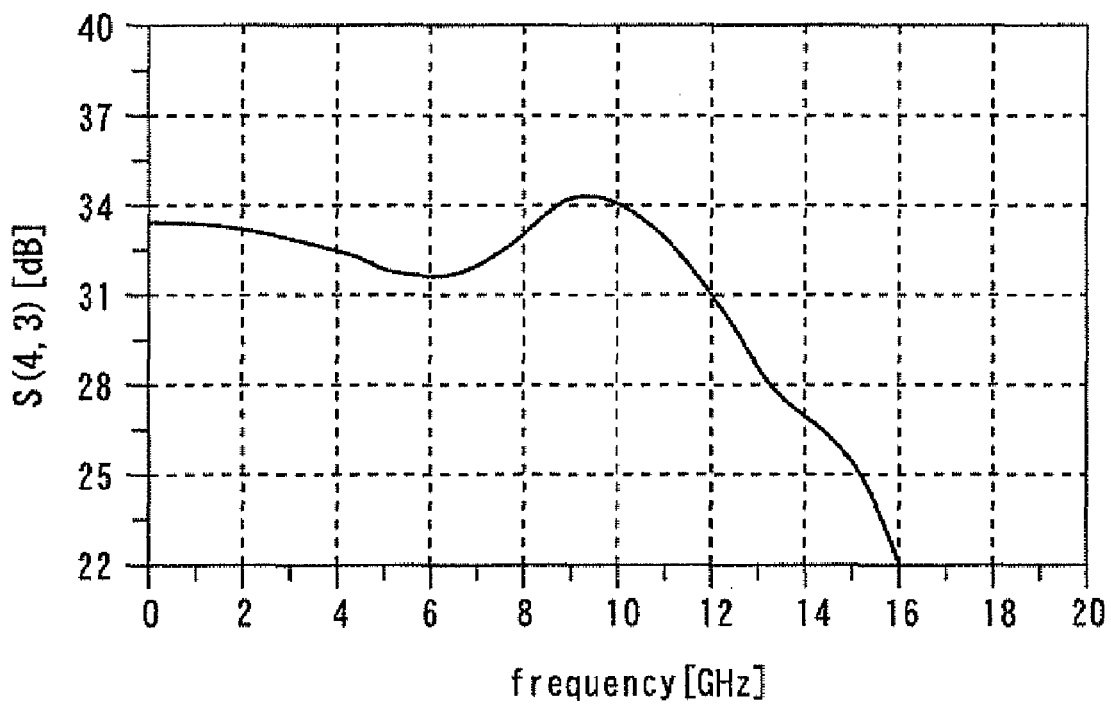
FIG. 11 shows the transmission characteristics of the optical module when the wire lengths of second signal lines were set to 9.1 mm (corresponding to an electrical length of 17.3 mm).
Figure 12:
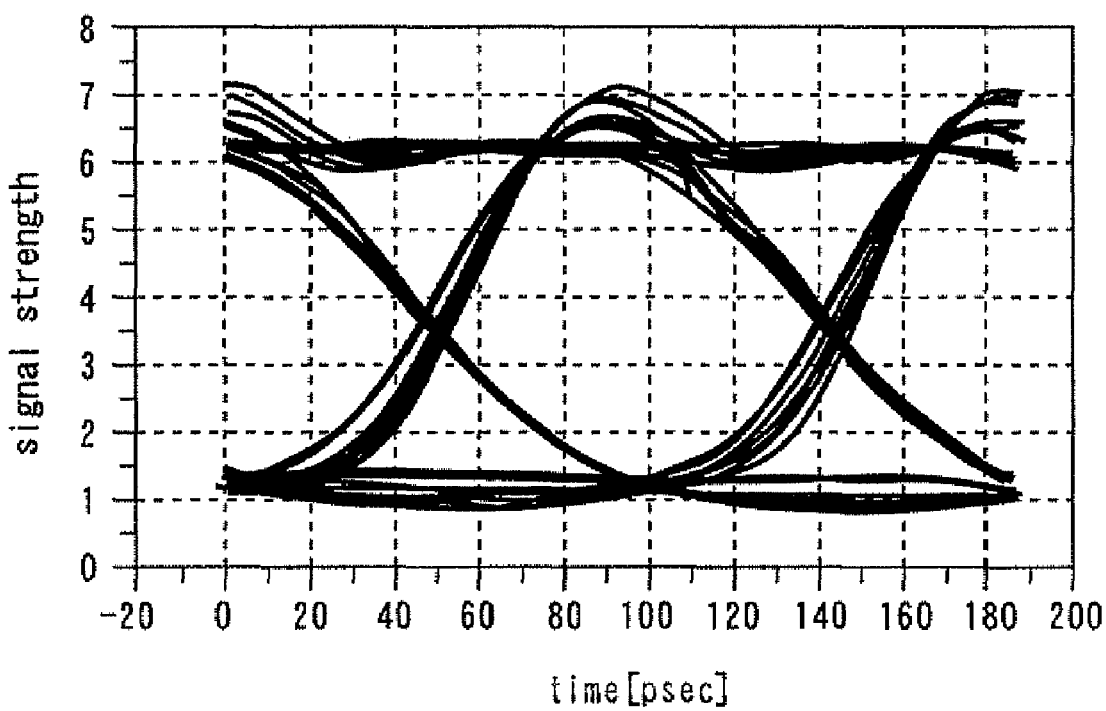
FIG. 12 shows the modulated optical waveform of the optical module when the wire lengths of second signal lines were set to 9.1 mm (corresponding to an electrical length of 17.3 mm).
Figure 13:
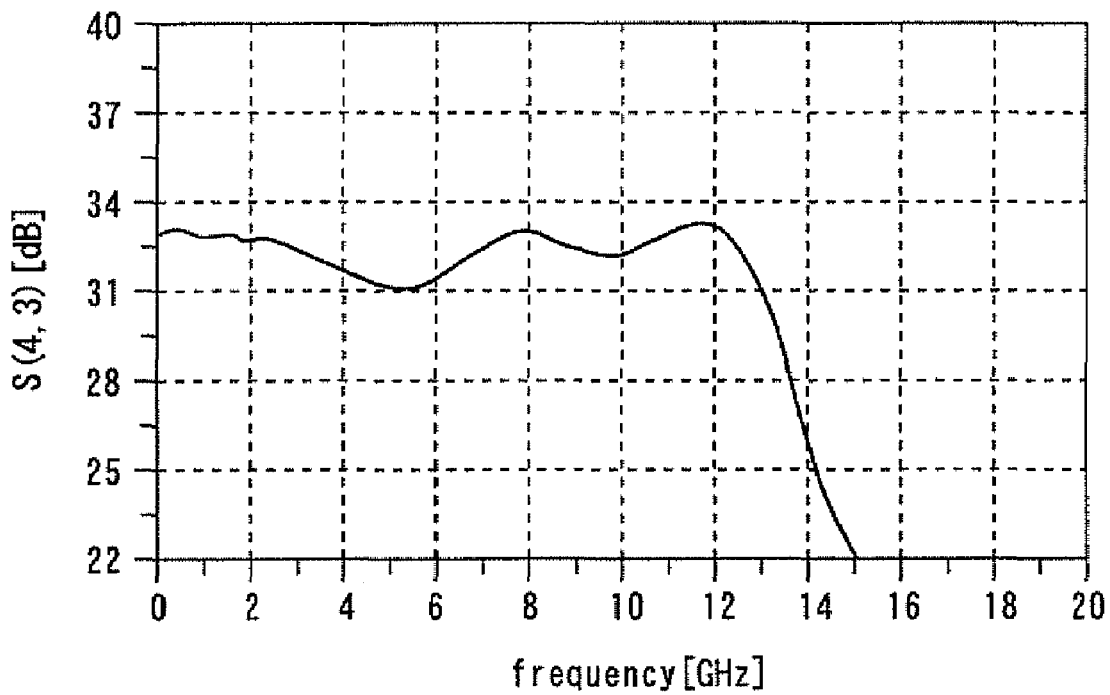
FIG. 13 shows the transmission characteristics of the optical module when the wire lengths of second signal lines were set to 12.1 mm (corresponding to an electrical length of 23.0 mm).
Figure 14:
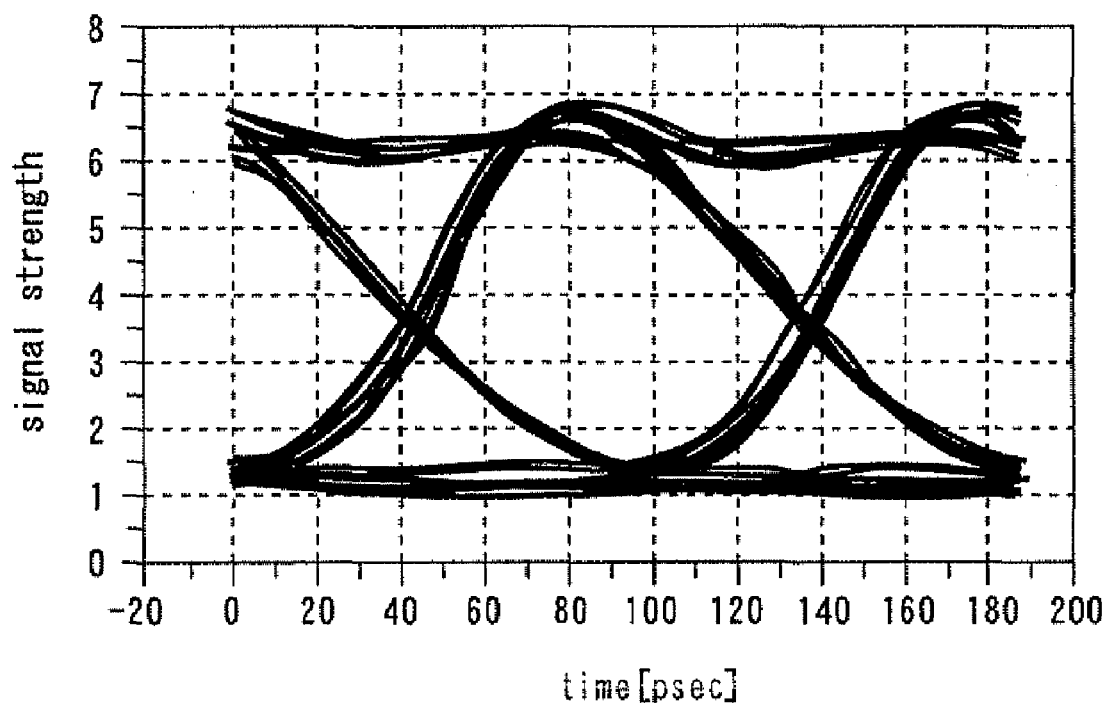
FIG. 14 shows the modulated optical waveform of the optical module when the wire lengths of second signal lines were set to 12.1 mm (corresponding to an electrical length of 23.0 mm).
Figure 15:
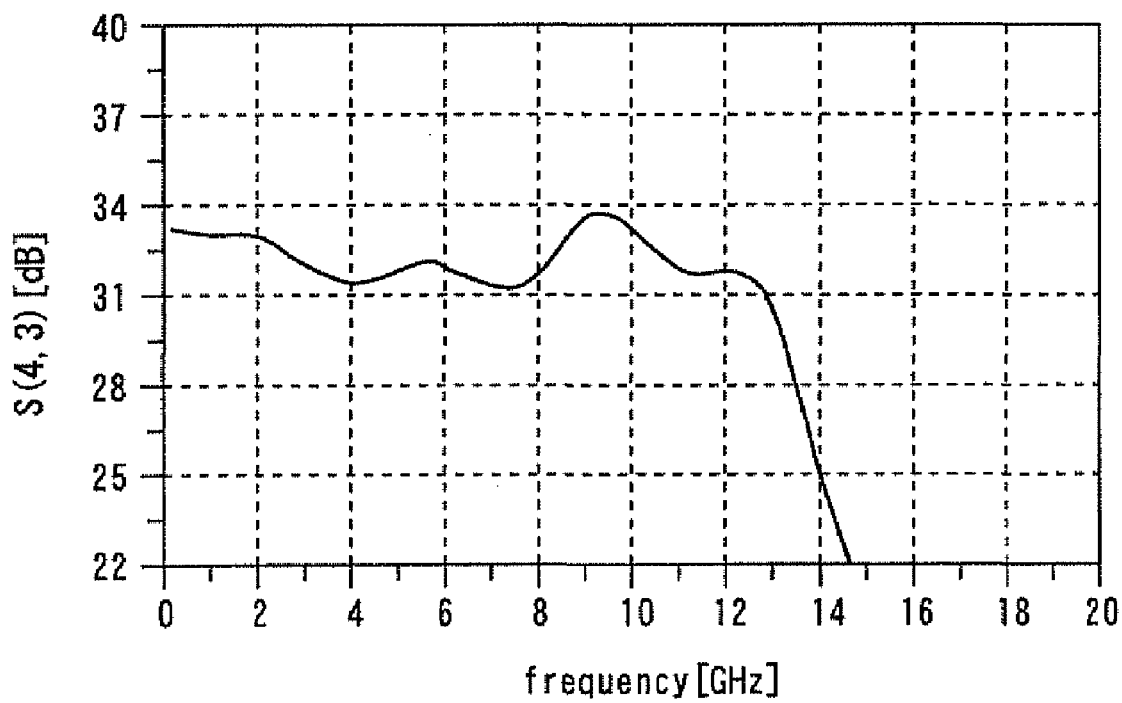
FIG. 15 shows the transmission characteristics of the optical module when the wire lengths of second signal lines were set to 19.1 mm (corresponding to an electrical length of 36.2 mm).
Figure 16:
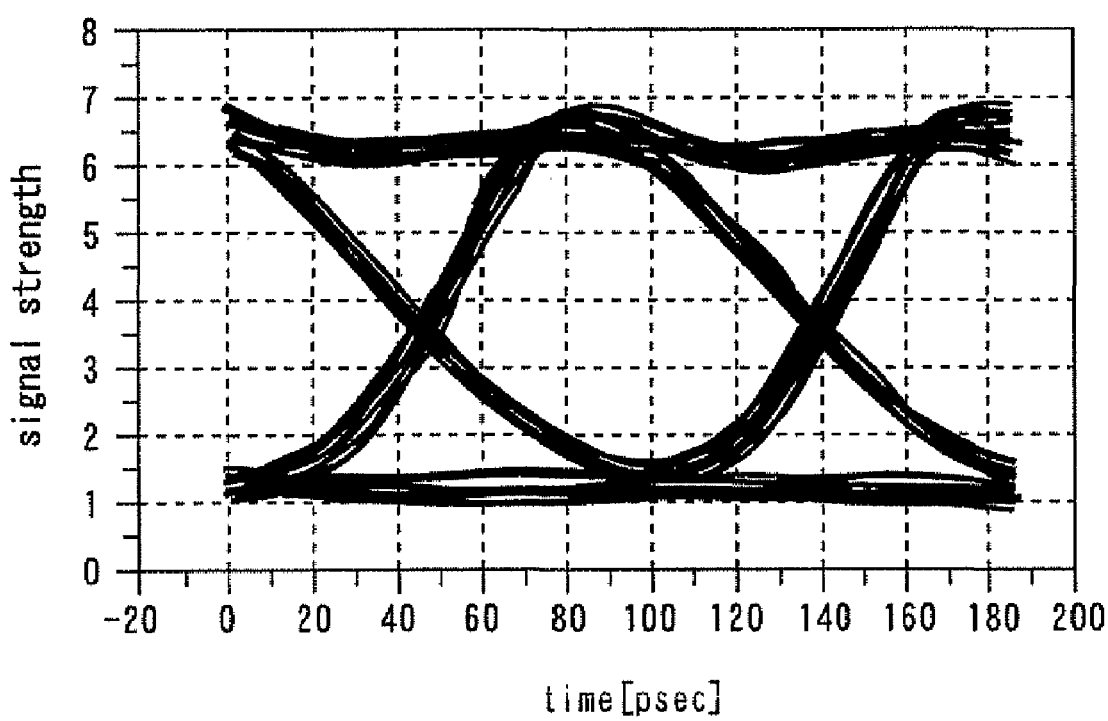
FIG. 16 shows the modulated optical waveform of the optical module when the wire lengths of second signal lines were set to 19.1 mm (corresponding to an electrical length of 36.2 mm).
Figure 17:
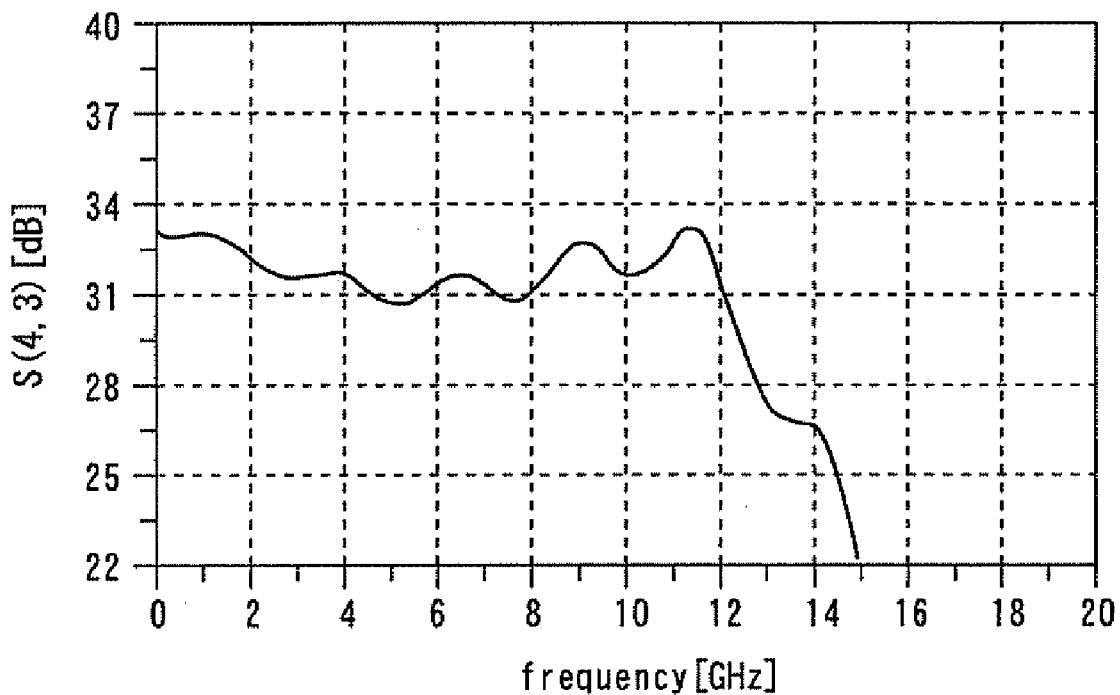
FIG. 17 shows the transmission characteristics of the optical module when the wire lengths of second signal lines were set to 29.9 mm (corresponding to an electrical length of 56.7 mm).
Figure 18:
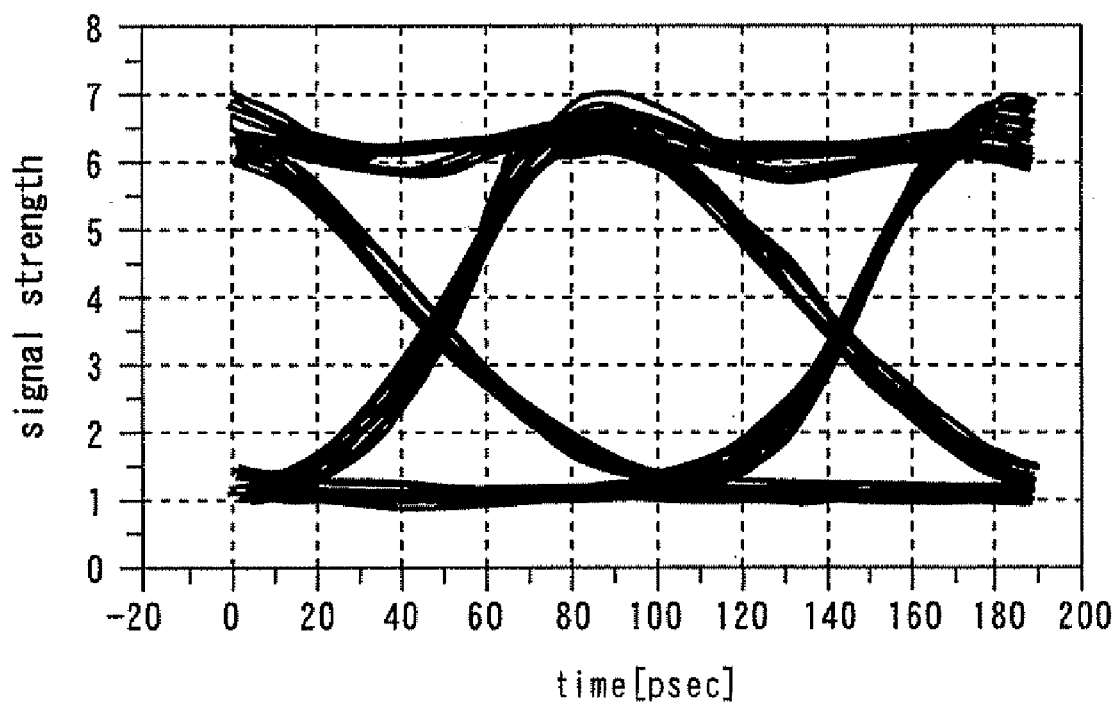
FIG. 18 shows the modulated optical waveform of the optical module when the wire lengths of second signal lines were set to 29.9 mm (corresponding to an electrical length of 56.7 mm).

Then, simulations were performed to determine how the transmission characteristics of the optical module vary with changes in the wire lengths (and hence the electrical lengths) of the second signal lines 24 and 25 when the impedances of the signal lines 8 and 12 are set to 42Ω and those of the signal lines 24 and 25 are set to 23Ω. Specifically, FIGS. 11 and 12 show the transmission characteristics and the modulated optical waveform, respectively, of the optical module when the wire lengths of the signal lines 24 and 25 were set to 9.1 mm (corresponding to an electrical length of 17.3 mm). FIGS. 13 and 14 show the transmission characteristics and the modulated optical waveform, respectively, of the optical module when the wire lengths of the signal lines 24 and 25 were set to 12.1 mm (corresponding to an electrical length of 23.0 mm). FIGS. 15 and 16 show the transmission characteristics and the modulated optical waveform, respectively, of the optical module when the wire lengths of the signal lines 24 and 25 were set to 19.1 mm (corresponding to an electrical length of 36.2 mm). Further, FIGS. 17 and 18 show the transmission characteristics and the modulated optical waveform, respectively, of the optical module when the wire lengths of the signal lines 24 and 25 were set to 29.9 mm (corresponding to an electrical length of 56.7 mm). These simulation results indicate that the optical module exhibits improved transmission characteristics and an improved modulated optical waveform when the electrical lengths of the signal lines 24 and 25 are 23.0-36.2 mm.

There will now be described the reason why the transmission characteristics of the optical module can be adjusted by varying the impedances and electrical lengths of the signal lines 24 and 25. First, the reflection frequency is expressed by Equation 1 below.

$$f = \frac{300}{4 \times L_1 \times \sqrt{\varepsilon_{r1}}} + \frac{300}{4 \times L_2 \times \sqrt{\varepsilon_{r2}}} + \ldots + \frac{300}{4 \times L_n \times \sqrt{\varepsilon_{rn}}} \quad [\text{GHz}] \qquad \text{Equation 1}$$

where: f is the reflection frequency; $L_1, L_2, \ldots, L_n$ are the lengths of the components of the optical module; and $e_{r1}, e_{r2}, \ldots, e_{rn}$ are the dielectric constants of these components. As this equation indicates, the reflection frequency occurring between the optical semiconductor device 3 and the end of the signal line 24 or the signal line 25 can be adjusted by varying the electrical length of the signal line. Further, the amount of reflection at the reflection frequency can be controlled by varying the impedance of the signal line, allowing for adjustment of the transmission characteristics of the optical module.

Figure 19:
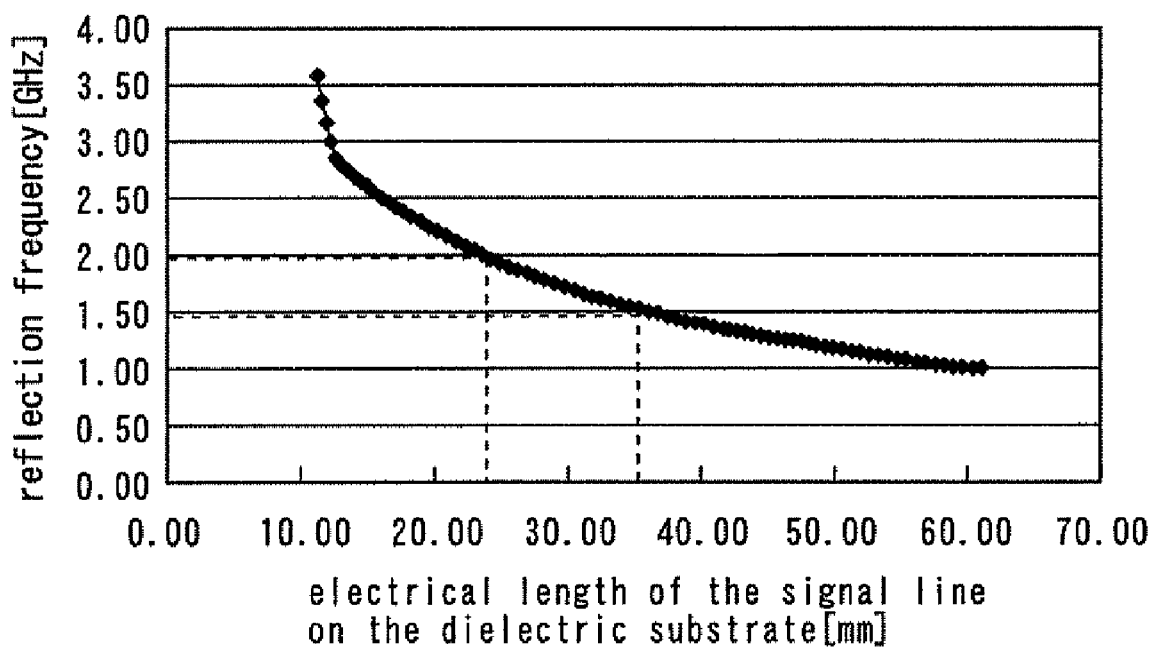
FIG. 19 shows the relationship between the electrical length of second signal line and the reflection frequency.
Figure 20:
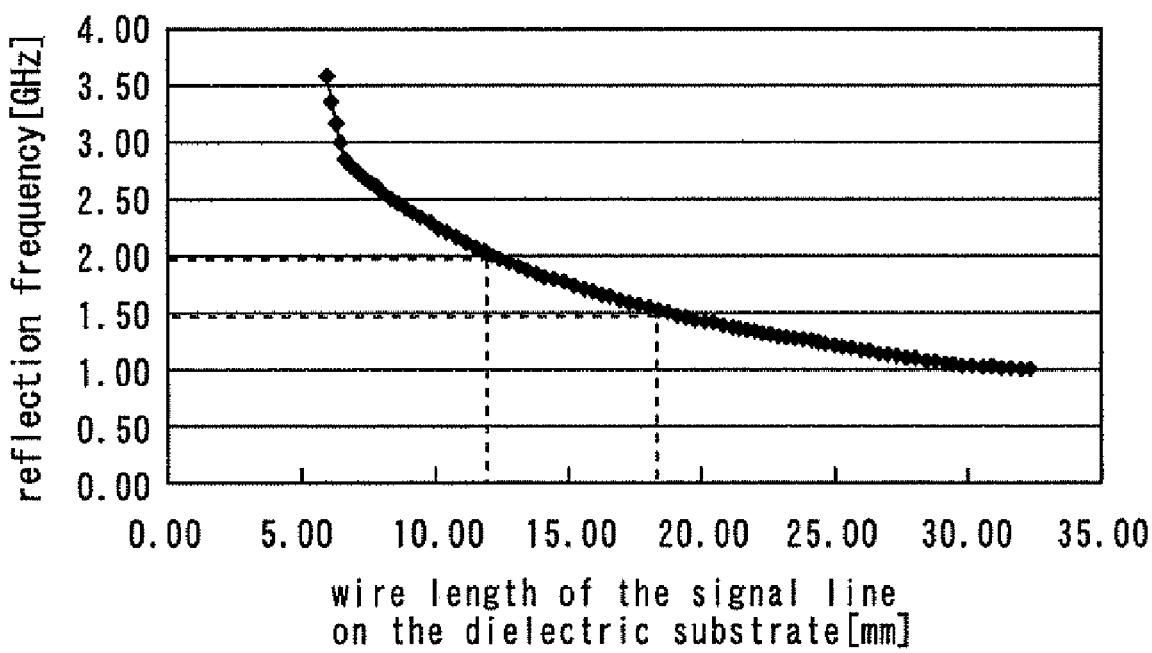
FIG. 20 shows the relationship between the wire length of second signal line and the reflection frequency.

FIG. 19 shows the relationship between the electrical length of the signal line 24 or 25 and the reflection frequency, and FIG. 20 shows the relationship between the wire length of the signal line 24 or 25 and the reflection frequency. These figures indicate that the reflection frequency is 1.5-2 GHz when the electrical length is set to 23.0-36.2 mm. Therefore, the transmission characteristics of the optical module can be adjusted at frequencies of 1.5-2 GHz. It should be noted that such adjustment also affects the transmission characteristics at frequencies that are double or triple those frequencies.

As described above, the present embodiment allows for an improvement in the transmission characteristics of an optical module without adding a resistive element for impedance matching. Therefore, the present invention can provide an optical module capable of operating at high temperature with low power consumption while providing a modulated optical waveform of good quality.

Obviously many modifications and variations of the present invention are possible in the light of the above teachings. It is therefore to be understood that within the scope of the appended claims the invention may be practiced otherwise than as specifically described.

The entire disclosure of a Japanese Patent Application No. 2006-310708, filed on Nov. 16, 2006 including specification, claims, drawings and summary, on which the Convention priority of the present application is based, are incorporated herein by reference in its entirety.

What is claimed is:

1. An optical module comprising:
   a stem;
   a protruding portion on a surface of said stem;
   an optical semiconductor device mounted on said protruding portion;
   a power supply terminal penetrating through said stem, said power supply terminal being insulated from said stem;
   a first dielectric substrate mounted on said protruding portion;
   a first signal line on said first dielectric substrate and connected to a first end of said power supply terminal;
   a second dielectric substrate on a rear surface of said stem; and
   a second signal line on said second dielectric substrate and connected to a second end of said power supply terminal,
   wherein said second signal line has an electrical length of 23.0-36.2 mm and an impedance of 21.5-24.5Ω.

2. The optical module as claimed in claim 1, wherein said optical semiconductor device has a resistance of 5-102Ω.

* * * * *